United States Patent [19]

Kobiella

[11] 4,050,372
[45] Sept. 27, 1977

[54] AUTOMATIC STRAPPING MACHINE

[75] Inventor: Robert J. Kobiella, Rolling Meadows, Ill.

[73] Assignee: Signode Corporation, Glenview, Ill.

[21] Appl. No.: 650,891

[22] Filed: Jan. 21, 1976

[51] Int. Cl.² .......................................... B65B 13/02
[52] U.S. Cl. ........................................ 100/2; 100/26; 100/33 PB; 156/73.5
[58] Field of Search .................. 100/2, 33 PB, 26, 29, 100/32; 156/73.5, 49.4, 502, 530; 140/93.2, 123.6

[56] References Cited

U.S. PATENT DOCUMENTS

| 3,331,312 | 7/1967 | Leslie et al. | 100/33 PB |
|---|---|---|---|
| 3,442,203 | 5/1969 | Kobiella | 100/33 PB |
| 3,442,732 | 5/1969 | Stensaker et al. | 100/33 PB |
| 3,442,733 | 5/1969 | Vilcins | 100/33 PB |
| 3,442,734 | 5/1969 | Ericsson | 100/33 PB |
| 3,442,735 | 5/1969 | Stensaker | 100/33 PB |
| 3,494,280 | 2/1970 | Kobiella | 100/2 |
| 3,548,740 | 12/1970 | Kobiella | 100/33 PB |

Primary Examiner—Billy J. Wilhite
Attorney, Agent, or Firm—Dressler, Goldsmith, Clement, Gordon & Shore, Ltd.

[57] ABSTRACT

An automatic strapping machine is disclosed wherein strap is fed at a high rate of speed about a package so as to form a loop which is then tensioned and sealed. The loop is formed so that the leading end of the strap is overlapped by a trailing end of the strap and the resulting overlapped strap portions are joined together so as to form a seal which is not susceptible to snagging. The distal end of the overlapping strap end portion is urged against and is moved back and forth relative to an underlying strap portion in tension at a high rate of speed so as to generate heat therebetween and to form a friction-fused joint. During joint formation the strap loop about the package is in tension, but the strap end portion overlapping the loop is relaxed, i.e., not in tension.

Sealing energy generating means is adapted to engage the distal end of the overlapping strap end portion and comprises a pivotable anvil and a rotatable - oscillatable hammer adapted to receive overlapping strap regions therebetween, and an oscillating motor means for the hammer which engages the loop-over-lapping strap end portion and rubs the overlapping end portion against the underlying strap region at a rate sufficient to melt an interface region therebetween and to form a friction-fused joint when energized by the oscillating motor means.

12 Claims, 15 Drawing Figures

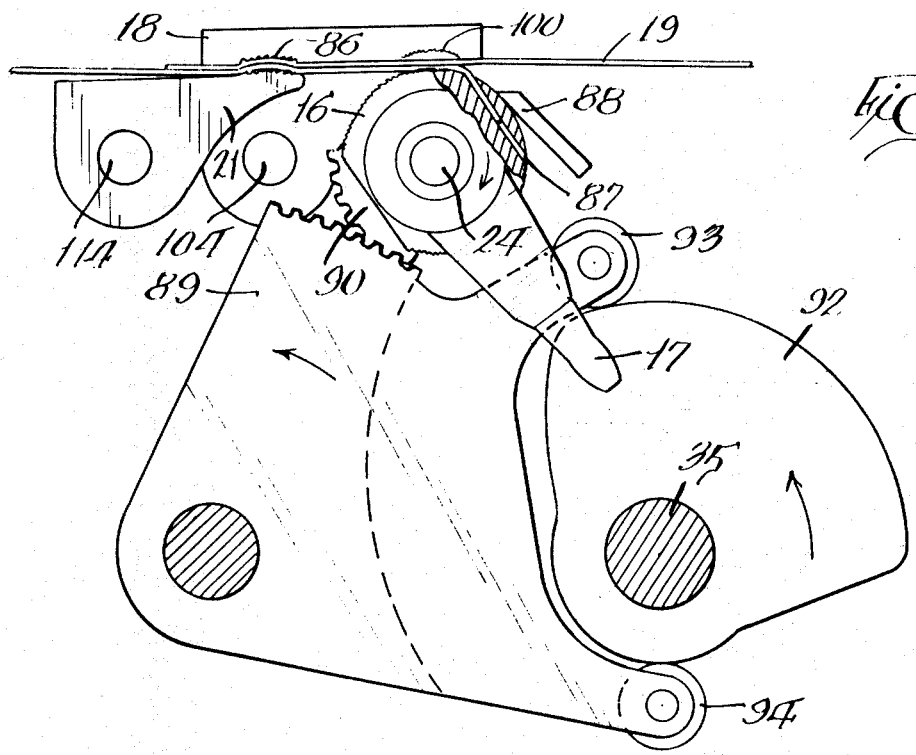
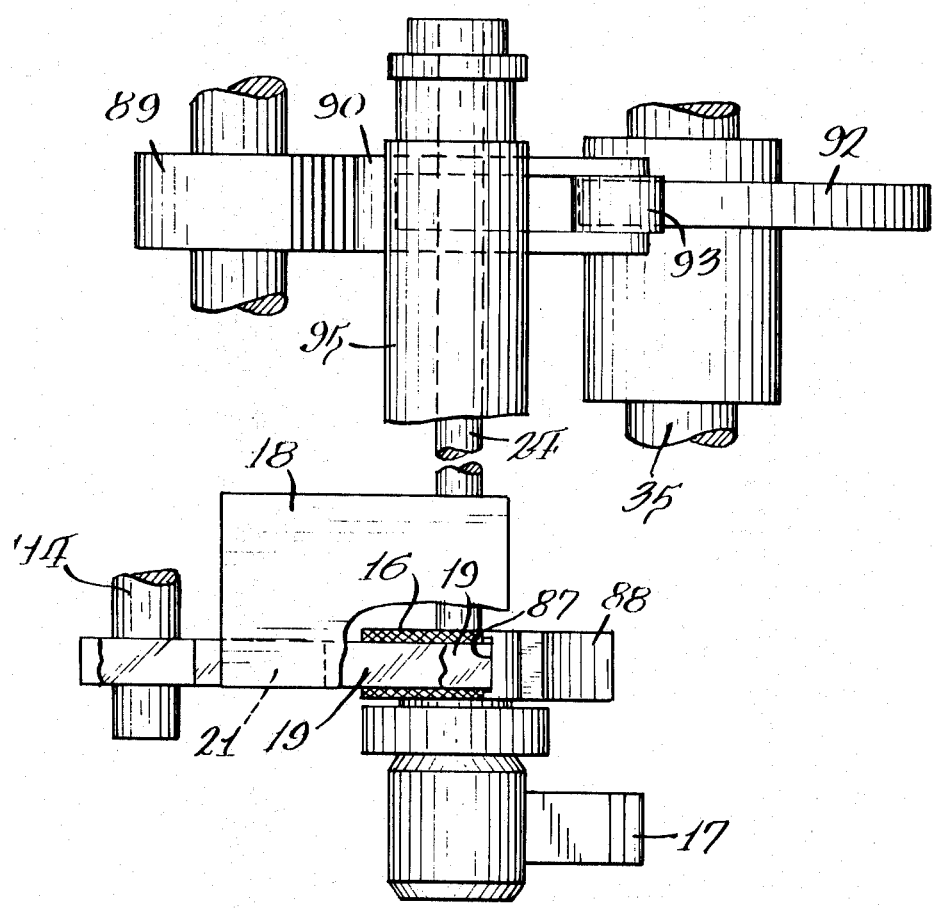

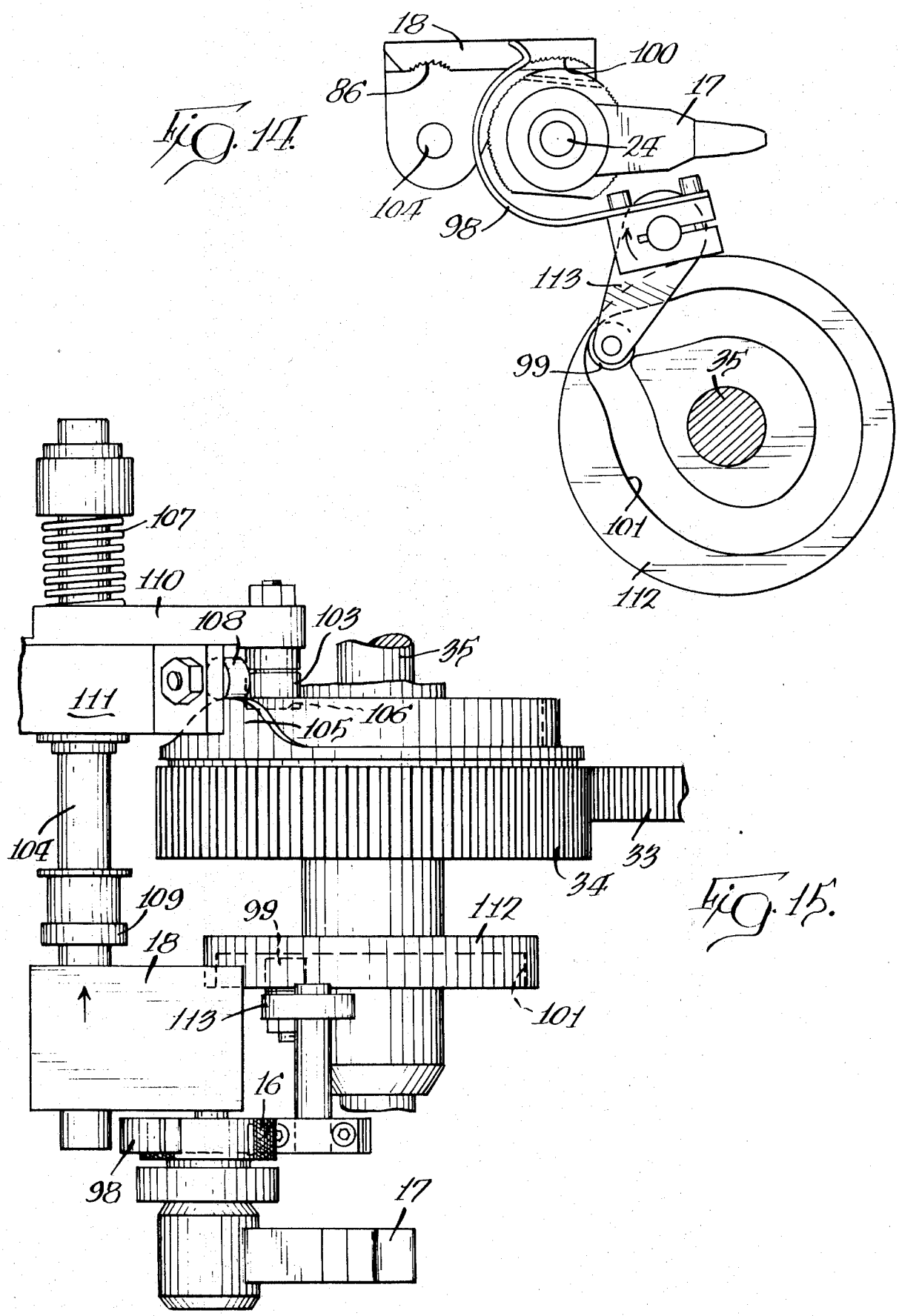

AUTOMATIC STRAPPING MACHINE

BACKGROUND OF THE INVENTION

This invention relates to an automatic strapping machine which feeds strap automatically around an article or a package, tensions the fed strap, and secures overlapped strap ends in place by a joint or seal. When thermoplastic strap is used, the joint is formed by frictionally fusing together the interface regions of overlapped strap portions.

It is known to tie packages of various shapes and configurations by means of thermoplastic strap. While such strap can be secured in place using an external seal which is crimped about overlapping strap regions or by the so-called hot knife method, in many instances it is more desirable to secure the strap by fusing together the overlapping strap ends by the generation of heat in situ by the rapid relative movement of overlapping strap portions which are biased toward one another by externally applied pressure. Joints formed in the foregoing manner are commonly referred to as friction-fused joints.

Various tools have been employed for forming a frictionfused joint; however, such tools usually place both overlapped strap portions in tension during joint formation. One such tool is disclosed in U.S. Pat. No. 3,442,203 to Kobiella. While a highly efficient joint can be formed in this manner, the tensioned strap portions tend to dampen the oscillatory motion of the sealing energy generating means and require a relatively high initial energy input. Other friction-fusion sealing tools are shown in U.S. Pat. No. 3,442,733 and U.S. Pat. No. 3,654,033.

Moreover, in many packaging applications it is desirable to feed strap at a relativly high rate about a package and to pull considerable tension on the strap that has been looped about a package, yet any increase in tension further dampens the oscillations needed to produce a friction-fused joint. Also, convenient means for the rapid feeding of strap about a package and the pulling of relatively high tension in the strap looped about a package heretofore have not been available.

SUMMARY OF THE INVENTION

The present invention provides a strapping machine and method whereby strap can be looped at a high rate of speed about a package, subsequently tensioned at a relatively high torque, and thereafter the formed, tensioned loop can be rapidly sealed by means of a friction-fused joint so that there exists no strap at the exposed, trailing strap end after the seal and the possibility of snagging and inadvertent opening of the formed seal is minimized.

The disclosed apparatus performs a strap feeding and tensioning function, a sealing function, and a power transmission function. The power transmission first actuates the strap feeding and tensioning function and then the sealing function. A single prime mover, such as a reversible electric motor, is a suitable power source for performing all of the aforesaid functions.

To form a strap loop sealed by friction-fusion, the strap is fed from a supply roll at a high rate of speed through appropriate guideways about the package to be strapped and then tensioned at a relatively high torque. Once a sufficient length of strap has been dispensed and disposed as a loop about the package so that the trailing strap end overlaps the leading strap end, a region of the leading strap end is gripped and held in the apparatus while the motor direction is reversed to draw tension on the strap and to form a tensioned loop about the package. After the desired tension has been drawn, an overlapping region of both strap ends is gripped so as to retain tension in the loop, the previously imposed grip on the leading strap end is released, tension is released on the free trailing strap end, and the latter is severed from the strap supply. While the formed strap loop is maintained under tension, the distal end of the free, untensioned trailing strap end is moved into frictional engagement with a region of the leading strap end which is under tension. Then the distal end of the free trailing strap end is rapidly rubbed thereagainst under pressure, thereby forming a molten interface region between the leading strap end and the very end of the trailing strap end portion. Thereafter the overlapping strap ends are momentarily held against one another to produce a friction-fused joint as the molten interface region cools. After the joint has been formed, the strapped package is disengaged from the strapping apparatus and the apparatus is ready to begin a new strapping cycle.

The sealing, i.e., seal-forming, function of the present apparatus is performed by a sealing energy generating mechanism which comprises a pivotable anvil and an oscillatable hammer means adapted to receive therebetween overlapping strap regions that are to be sealed. An oscillating motor means, such as a torsion bar, is connected to the hammer means. The hammer means is also rotatably mounted and is provided with a channel through which the strap is fed. In this manner the hammer means coacts with a stationary cutter blade to sever the trailing end of the strap loop prior to sealing the overlapping strap ends. The hammer is also adapted to grip the distal end of the trailing strap end portion preparatory to sealing.

To seal the ends of a formed strap loop, the torsion bar connected to the hammer means is temporarily immobilized against rotational movement after the strap loop has been severed from the strap supply and the hammer means is cocked by a rotating cam means which acts on a trigger associated with the hammer means and twists the oscillating motor means such as the torsion bar. Upon release of the trigger after maximum displacement by further action of the rotating cam means, the energy stored in the oscillating motor means is dissipated by the oscillatory action of the hammer means. Prior to release of the trigger, the hammer means has been brought into engagement with the distal end of the untensioned trailing end portion of the strap loop and causes the untensioned trailing end portion to bear against an underlying tensioned region of the leading end of the strap loop. Thus, upon release of the trigger, the resulting oscillatory motion of the hammer means rubs the overlapping strap ends against one another, generates heat between the overlapping strap ends, and causes fusion thereof. A feature of the present invention is that the very end of the trailing strap end portion can be securely welded to the strap loop thereby minimizing snagging of the joined strap portions.

BRIEF DESCRIPTION OF THE DRAWINGS

In the drawings,

FIG. 9 is an enlarged front elevational view showing the hammer position after strap cut-off;

FIG. 10 is a plan view, partially broken away, of the hammer position shown in FIG. 9;

FIG. 14 is an enlarged fragmentary front elevational view showing ejector position after the completion of a strap loop tensioning and sealing cycle; and FIG. 15 is a plan view, partially broken away, of FIG. 14.

DESCRIPTION OF THE PREFERRED EMBODIMENTS

Figure 1:
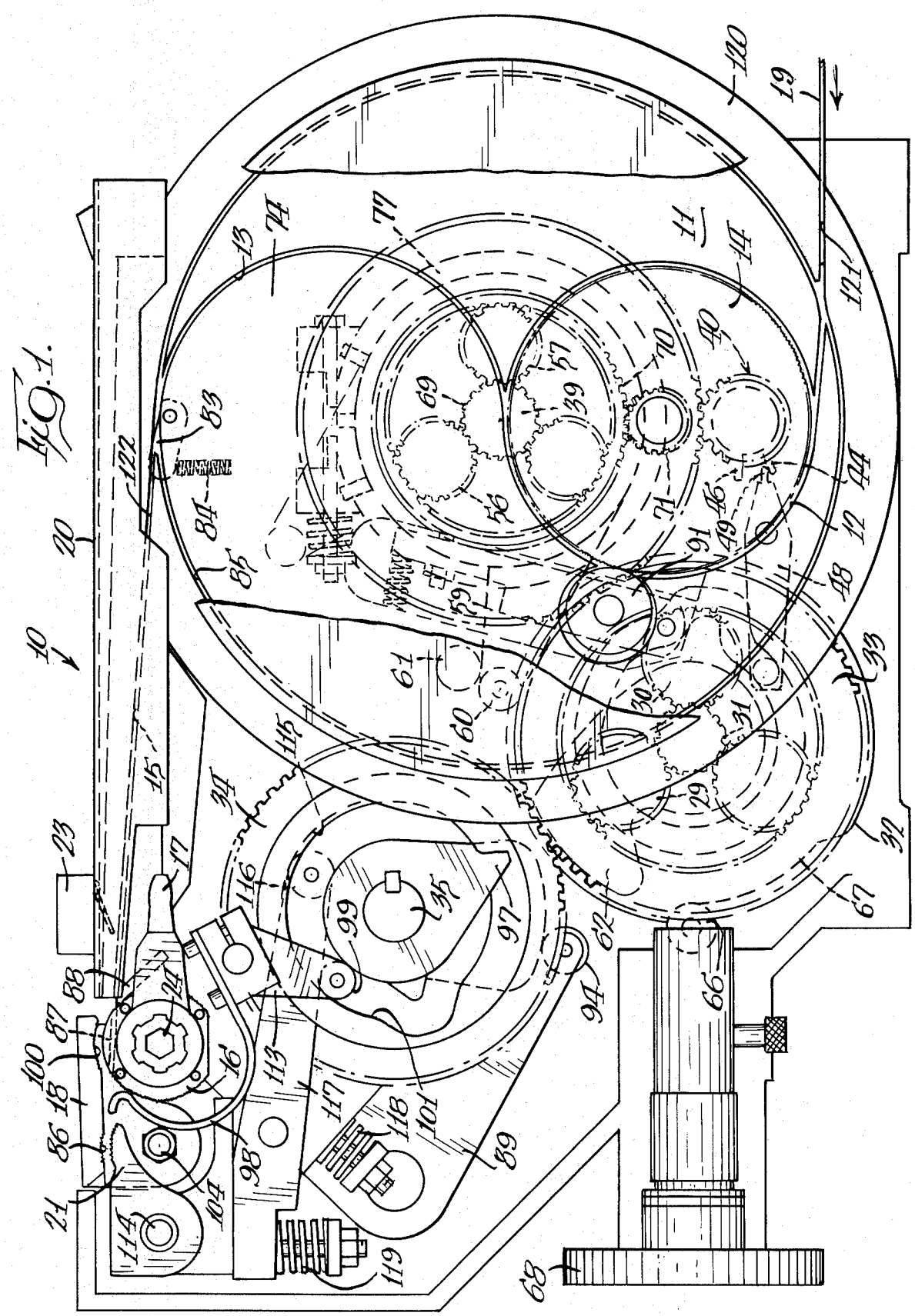
FIG. 1 is a front elevational view of a strapping apparatus embodying the present invention, parts thereof being broken away to show internal construction.

The automatic strapping machine shown in the drawings includes a strap feeding and tensioning mechanism and a strap sealing mechanism. Both mechanisms are driven by a reversible electric motor through a power transmission means which actuates one or the other of the aforesaid mechanisms.

Figure 2:
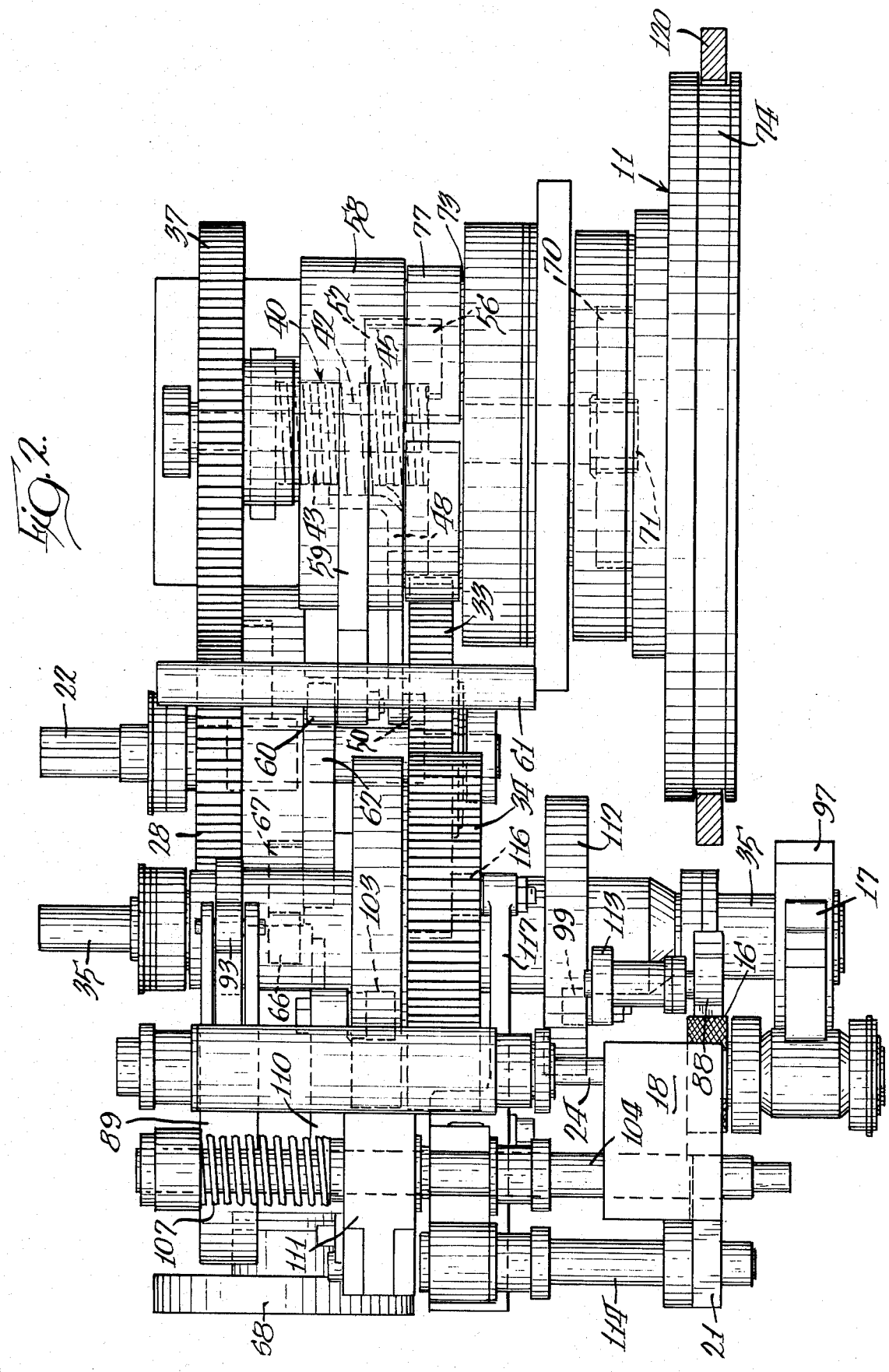
FIG. 2 is a plan view of the strapping apparatus shown in FIG. 1, partially broken away to show interior detail.

Referring generally to FIGS. 1 and 2, the strap feeding and tensioning mechanism of strapping apparatus 10 includes rotatable winder drum 11 provided with arcuate strap feed guideways ways 12 and 13 which communicate with each other but have opposite curvatures, and with outer strap guide 120 which is an annular ring surrounding the peripheral winding surface of winder drum 11 but spaced therefrom. Additionally, high-speed strap feed wheel 14 is rotatably mounted on winder drum or spool 11 and revolves about the axis of winder drum 11 as the latter rotates. Strap 19 to be looped about a package or the like is directed into winder drum 11 and passes therethrough via arcuate strap feed guideways 12 and 13 before entering strap guide 15 from whence it passes through the strap sealing mechanism which includes hammer 16 mounted on one end of torsion bar 24 and actuated by trigger 17, coacting with cocking cam 97 and pivoting anvil 18. Outer strap guide 120 is stationary and is provided with strap inlet guideway 121 and strap oulet guideway 122 which are in registry with guideways 12 and 13, respectively, when winder drum 11 is in normal rest position while strap is fed therethrough.

In the sealing mechanism portion of the strapping apparatus 10, the strap from guideway 15 passes through gate or channel 87 in hammer 16, over the tip of ejector arm 98 and holding gripper jaw 21, and then enters a peripheral strap guideway or chute which loops the strap about the package. The peripheral strap guideway terminates in substantially horizontal guideway portion 20 directing the leading strap end below pivoting anvil 18 and in juxtaposition with pivotally-mounted holding gripper jaw 21. Limit switch 23 detects the passing of the leading end of the strap through horizontal guideway 20 and causes reversal of the rotational direction of the prime mover for the strapping machine by the time the aforementioned leading strap end is in a position to be subsequently gripped and held by gripper jaw 21.

However, after the aforementioned reversal of rotational direction has taken place but before gripper jaw 21 is actuated, the leading strap end is first gripped between pivoting anvil 18 and hammer 16 while the strap is being wound at a relatively low speed on winder drum 11 for tensioning.

To effect sealing of the strap segment that has been looped about a package and tensioned, trigger 17 is rotated clockwise so that the portion of the strap which is not necessary for forming the final tensioned loop about the package is severed from the tensioned loop, and the trailing free, i.e., untensioned strap end adjacent to the tensioned loop is positioned in an overlapping relationship with the leading strap end and urged thereagainst by the force generated between hammer 16 and anvil 18. Thereafter, torsion bar 24 is locked against rotation, and trigger 17 is rotated further by the action by cocking cam 97, so as to store a predetermined amount of energy in torsion bar 24, and subsequently released. Upon release of trigger 17, torsion bar 24 rapidly oscillates hammer 16 so as to rub one overlapping strap portion against another at a rate sufficient to melt a strap interface region therebetween which subsequently solidifies to form a joint or seal. In this manner the very end of the trailing strap end portion can be fused to the tensioned loop so as to provide a joint without a so-called "tail", a joint which cannot snag and be inadvertently torn open.

Power input to the strap feeding and tensioning mechanism as well as to the strap sealing mechanism is effected via input shaft 22 which is driven by an appropriate reversible motor such as an electric motor or the like. Both mechanisms and the actuation thereof will be separately described in greater detail hereinbelow with particular reference to the various gears, cams, springs, and other machine elements which constitute each mechanism.

Strap Feeding and Tensioning Mechanism

Figure 3:
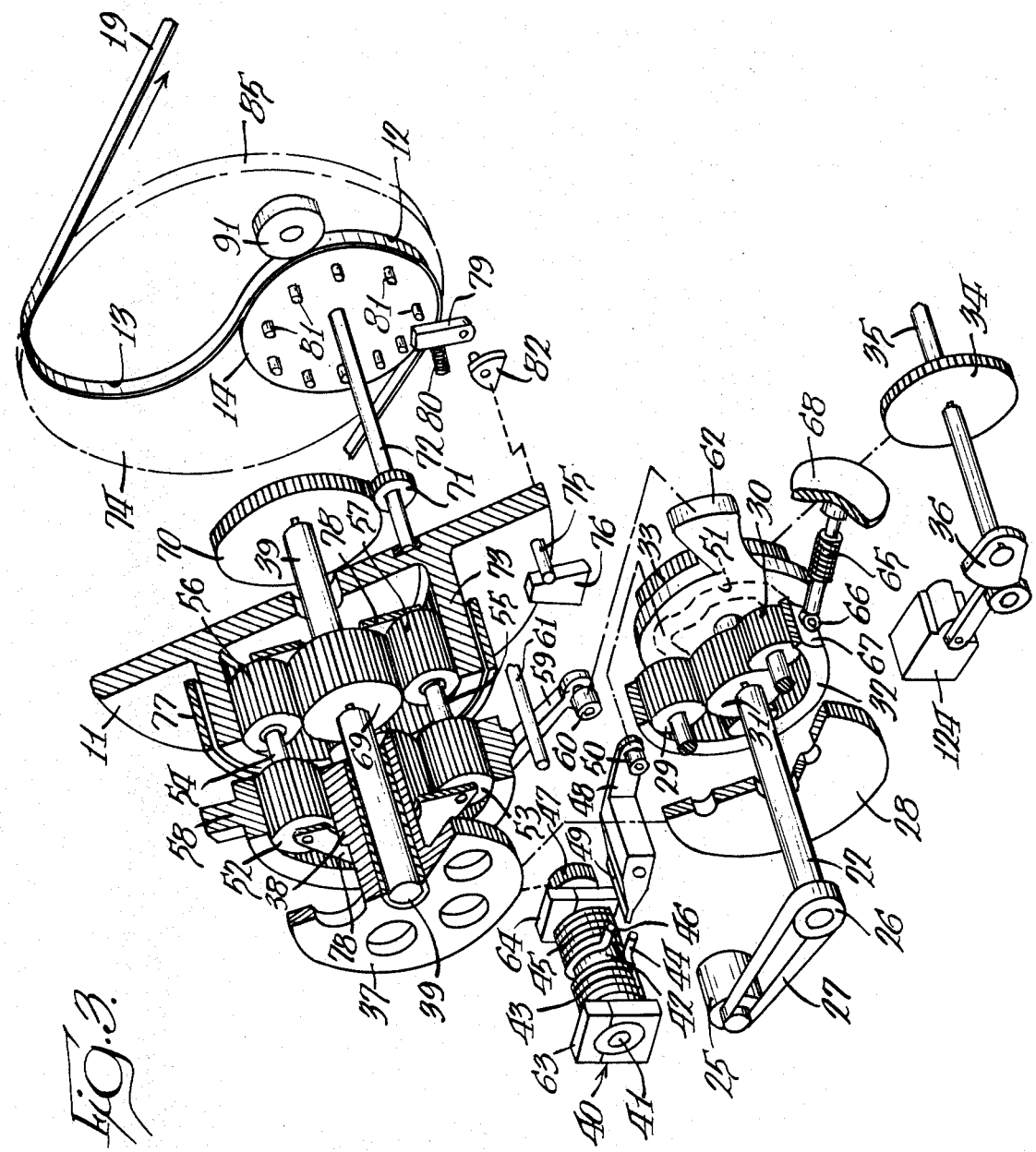
FIG. 3 is a fragmentary perspective view, partially broken away, taken from the rear of the apparatus shown in FIG. 1 and showing the strap feeding and tensioning mechanism.
Figure 4:
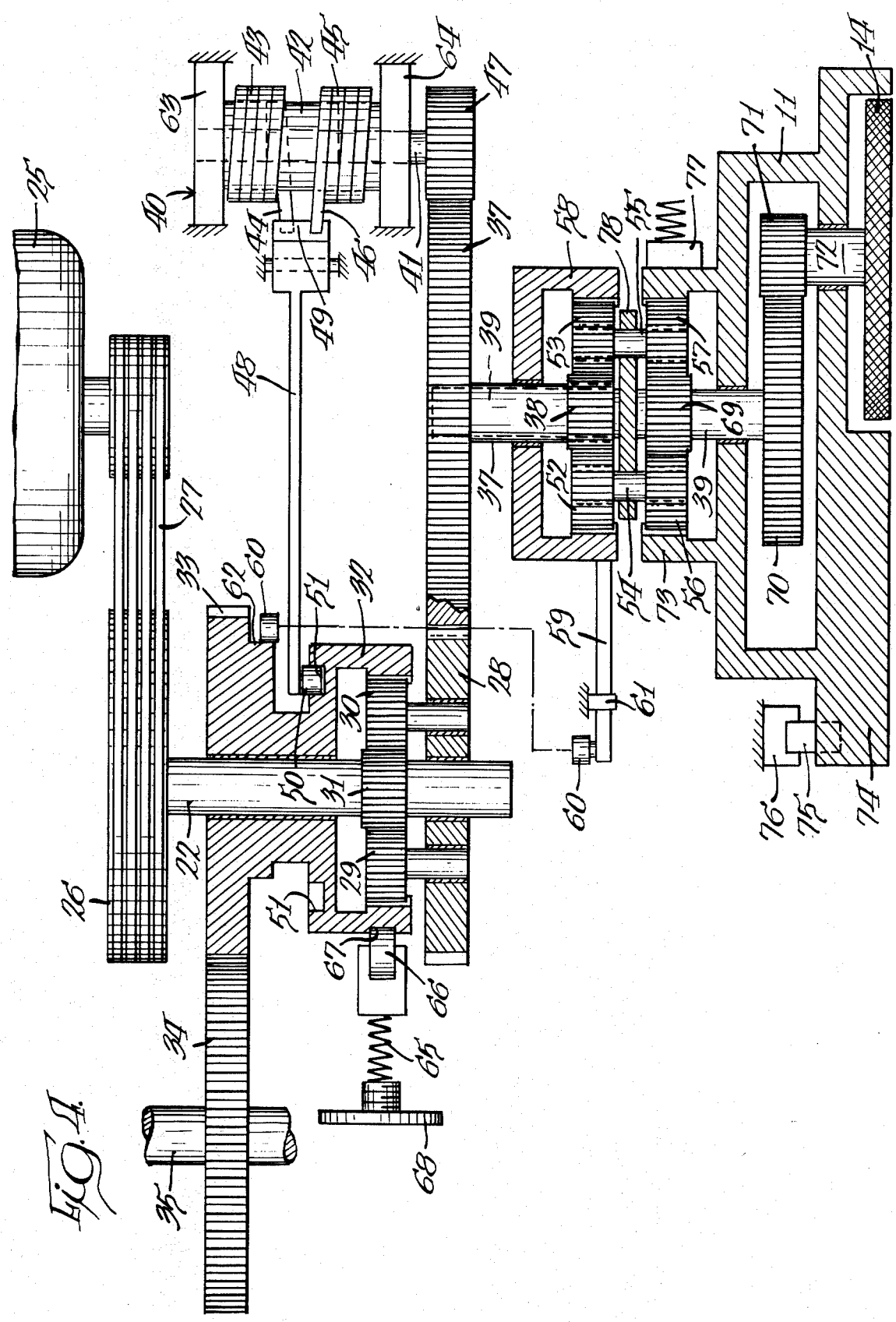
FIG. 4 is a sectional view schematically illustrating power transmission to the sealing and tensioning mechanisms of the apparatus shown in FIG. 1.

The overall relationship of the machine elements which make up this particular mechanism is illustrated in FIG. 3 and schematically depicted in FIG. 4. This mechanism can be effectively utilized with thermoplastic strap, e.g., polypropylene strap, nylon strap, or the like, as well as with metal strap.

Referring to FIG. 3, the output shaft of reversible electric motor 25 is connected to sheave 26 affixed at one end of input shaft 22 by means of endless belt 27. The strap feeding and tensioning mechanism is actuated by input carrier gear 28 journaled on input shaft 22 and driven through three input planet gears such as planet gears 29 and 30 in FIG. 3 which are journaled in carrier gear 28. Input sun gear 31 is keyed to shaft 22 and drives planet gears 29 and 30. Input planetary ring gear 32 also engages planet gears 29 and 30 at one end of the housing and is integral with cam drive gear 33 at the other end of the housing. Cam drive gear 33 meshes with cam gear 34 keyed to cam shaft 35 which shaft carries limit switch cam lobe 36 keyed thereto for actuation of limit switch 124 used to return the prime mover such as electric motor 25 to its forward operating mode at the completion of the sealing cycle. Input carrier gear 28 drives winder sun gear 38 journaled on feed wheel input shaft 39 by means of winder input gear 37. Winder sun gear 38 and winder input gear 37 are integral with one another.

Transmission lock means 40 comprises transmission lock shaft 41 journaled in stationary mounts 63 and 64 and provided with bi-directional spring clutch 42 which includes clockwise lock spring 43 terminating in lock spring tang 44 and counterclockwise lock spring 45 terminating in lock spring tang 46, as well as lock shaft gear 47 which meshes with winder input gear 37. Transmission lock arm 48 is pivotally mounted on the machine housing and is provided at one end with actuator finger 49 adapted to engage tangs 44 and 46 and on the other end with cam follower 50 which engages transmission lock cam 51 in the housing of input planetary ring gear 32.

Winder sun gear 38 drives three tension release planetary gears such as planet gears 52 and 53 which share common shafts 54 and 55 with winder planetary gears, i.e., planet gears 56 and 57, respectively. All common shafts for both sets of planet gears are carried on the same common planet carrier 78. Tension-release ring gear 58 also meshes with planetary gears 52 and 53, and is provided with integral cam-controlled reaction arm 59 which terminates in cam follower 60 and which serves to release tension on the strap before severing and after a loop has been formed and tensioned about a package. Reaction arm 59 abuts stop bar 61 during the strap feed cycle. Reaction arm 59 is affixed to the housing of tension release ring gear 58 and carries cam follower 60 which is adapted to engage cam lobe 62 during a portion of the tensioning operation.

The maximum degree of tension to which the strap loop is subject during tensioning is determined by tension control spring 65 which is a compression spring urging detent roller 66 against tension control cam 67 on the outer surface of input planetary ring gear 32. The degree of compression for spring 65 is determined by tension adjustment knob 68.

Feed wheel input sun gear 69 and feed wheel drive gear 70 are keyed on feed wheel input shaft 39. Three strap winder planetary gears, such as planetary gears 56 and 57 shown in FIG. 3, drive sun gear 69 and thus shaft 39 and drive gear 70. Feed wheel pinion 71 is keyed on shaft 72 which also carries strap feed wheel 14. Drive gear 70 meshes with feed wheel pinion 71 and drives feed wheel 14 through shaft 72 a portion of which is journaled in winder drum 11. Feed wheel 14 and winder drum 11 are positioned relative to one another so that the rotational axis of feed wheel 14 is parallel to but spaced from the rotational axis of winder drum 11. The other end of shaft 72 is journaled in winder face plate 74 which is integral with winder drum 11. Winder planetary ring gear 73 engages planet gears 56 and 57 and is integral with winder drum 11. Pin 75 on winder drum 11 is positioned to abut stop 76 when winder drum 11 is in its home position. Drag brake 77 engages the outer surface of winder planetary ring gear 73 and serves to hold winder drum 11 in the home position, i.e., with pin 75 abutting stationary stop 76 during strap take-up by feed wheel 14, and maintains pre-tention on the strap looped about a package as winder drum 11 is turned to tension the loop. Drag brake 77 is adjusted to begin slipping after a predetermined tension has been pulled on the formed strap loop by high-speed feed wheel 14 rotating in reverse direction during the initial stage of strap tensioning.

The strap feeder planetary gears and the winder planetary gears share common planet carrier 78 which also carries common shafts 54 and 55.

Feed wheel lock pawl 79 is pivotally mounted on boss 82 which is connected to winder drum 11, is biased by spring 80, and is adapted to engage peripheral stop pins 81 on the back face of feed wheel 14 so as to lock feed wheel 14 against rotation in the clockwise direction when winder drum 11 is not in its home position. In the alternative, lock pawl 79 can be made to interact with feed wheel drive gear 70 for the same purpose.

Bias roller or pinch roller 91 is rotatably mounted on winder guide plate 74 so as to project into first arcuate guideway 12 and to urge strap 19 against feed wheel 14. If desired, feed guideway 13 can be provided with a friction surface along the convex portion thereof for frictionally engaging the strap during tensioning by winder drum 11. Strap diverter means such as elongated member 83 is pivotally mounted on winder drum face plate 74 near the exit end of guideway 13. Elongated member 83 is biased by spring 84 to direct strap exiting from guideway 13 into guide 122 and guideway 15.

Operation of Strap Feeding and Tensioning Mechanism

Figure 5:
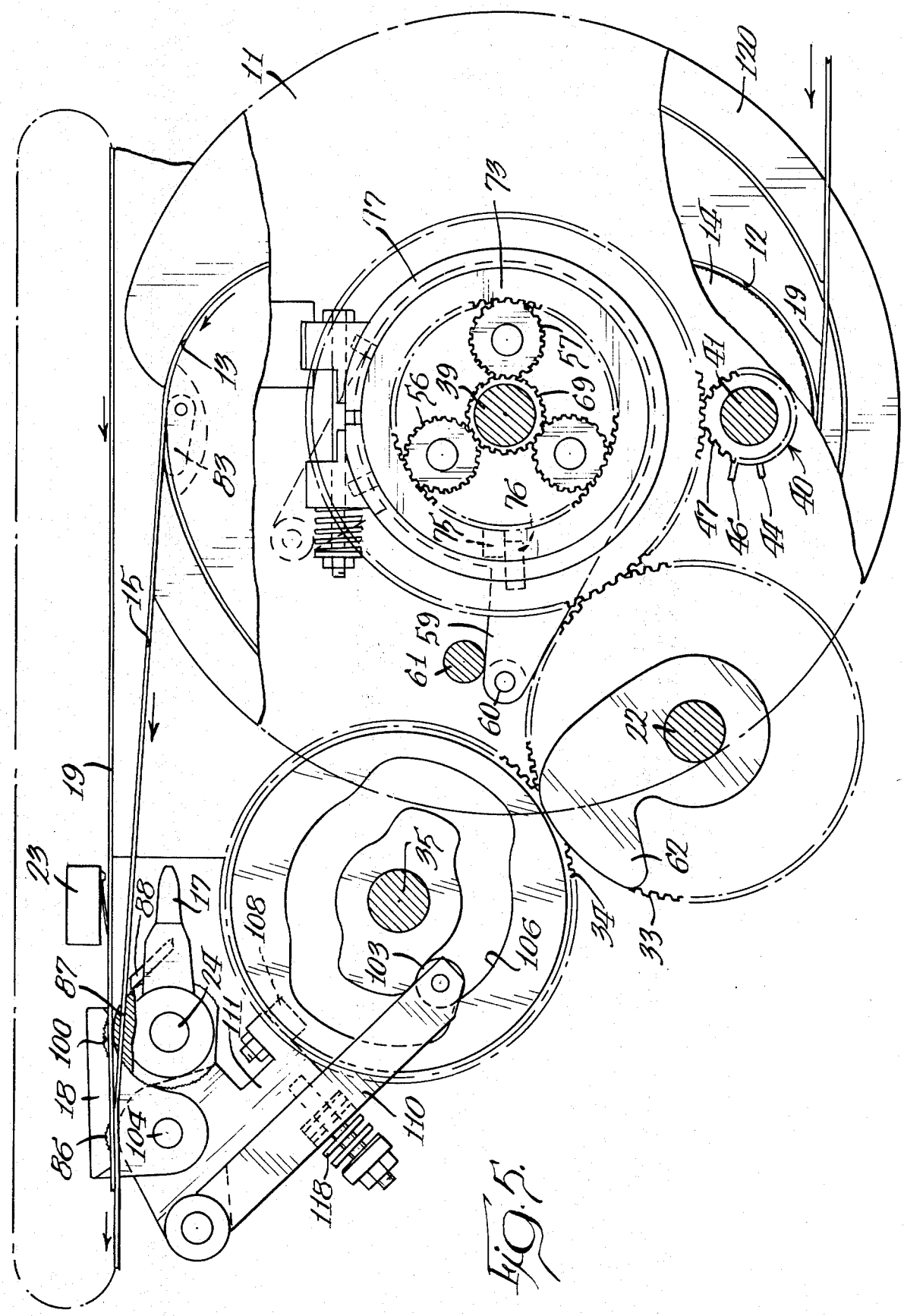
FIG. 5 is an enlarged fragmentary front elevational view, partly broken away, showing the strap feeding and tensioning mechanism during the strap feeding step.
Figure 6:
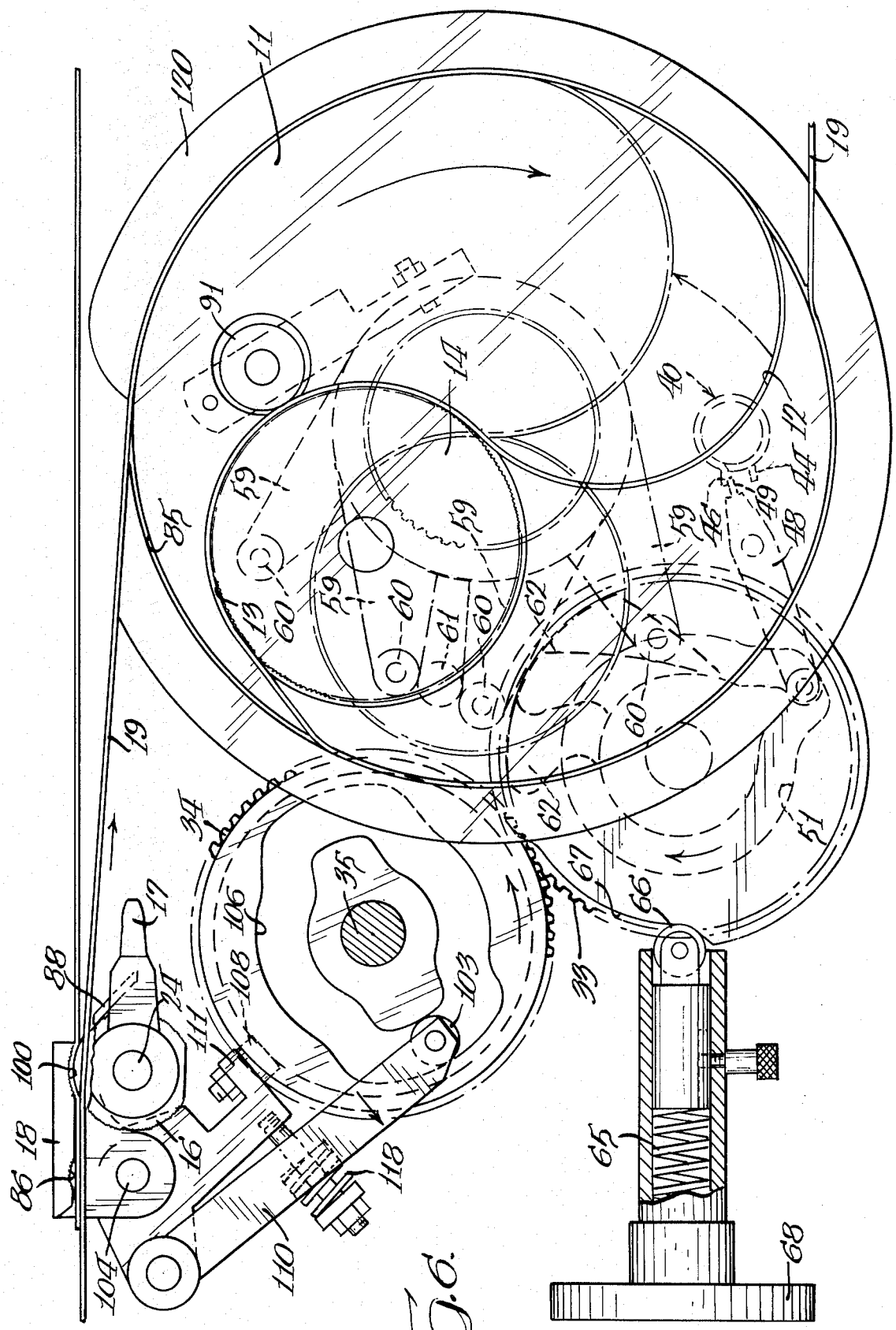
FIG. 6 is an enlarged fragmentary front elevational view similar to FIG. 5 and showing the strap feeding and tensioning mechanism during strap tensioning and subsequent strap relaxation, the position of the various machine elements during strap relaxation being shown in phantom.

Referring to FIGS. 1, 5 and 6, when strapping apparatus 10 is energized at the beginning of a strapping cycle, strap 19 is fed into strap inlet guide 121 and first arcuate strap feed guideway 12, and then engages high-speed feed wheel 14 which is rotating in a clockwise direction at a relatively high speed. Continued rotation of feed wheel 14 at relatively high speed transports strap 19 into and through second arcuate strap feed guideway 13 as set forth hereinabove. Optional pivotable strap diverter 83, biased by coil spring 84, can be utilized adjacent the exit end of guideway 13 to make sure that strap 19 enters strap exit guide 122 and guideway 15. During this time period, winder drum 11 remains stationary. After a strap loop has been formed around the package as determined by limit switch 23, the rotational direction of feed wheel 14 is reversed and feed wheel 14 is driven in reverse at relatively high speed to take up excess slack. Just prior to reversal of feed wheel 14 the leading strap end is gripped between anvil 18 and hammer 16 by pivoting anvil 18 downwardly as shown in FIG. 6.

During strap feed, input planetary gear 32 is in the position shown in FIG. 1 with detent roller 66 engaging tension control cam 67 at the upper end of the detent. Transmission 40 is locked in the counterclockwise direction at this time, so that when direction of rotation is reversed, input planetary gear 32 rotates clockwise about 45 degrees without pushing detent roller 66 outwardly. During the time period cam gear 34 turns and actuates anvil carrier arm 110 (FIG. 5) to pivot anvil 18 downwardly and grip the leading end of strap 19 between hammer 16 and anvil 18. After the leading strap end has been gripped between anvil 18 and hammer 16, continued rotation of input planetary gear 32 pivots transmission lock arm 48 to engage tang 46 and unlock the transmission, thereby allowing feed wheel 14 to reverse and take up slack in the strap that has been fed through winder drum 11.

Figure 7:
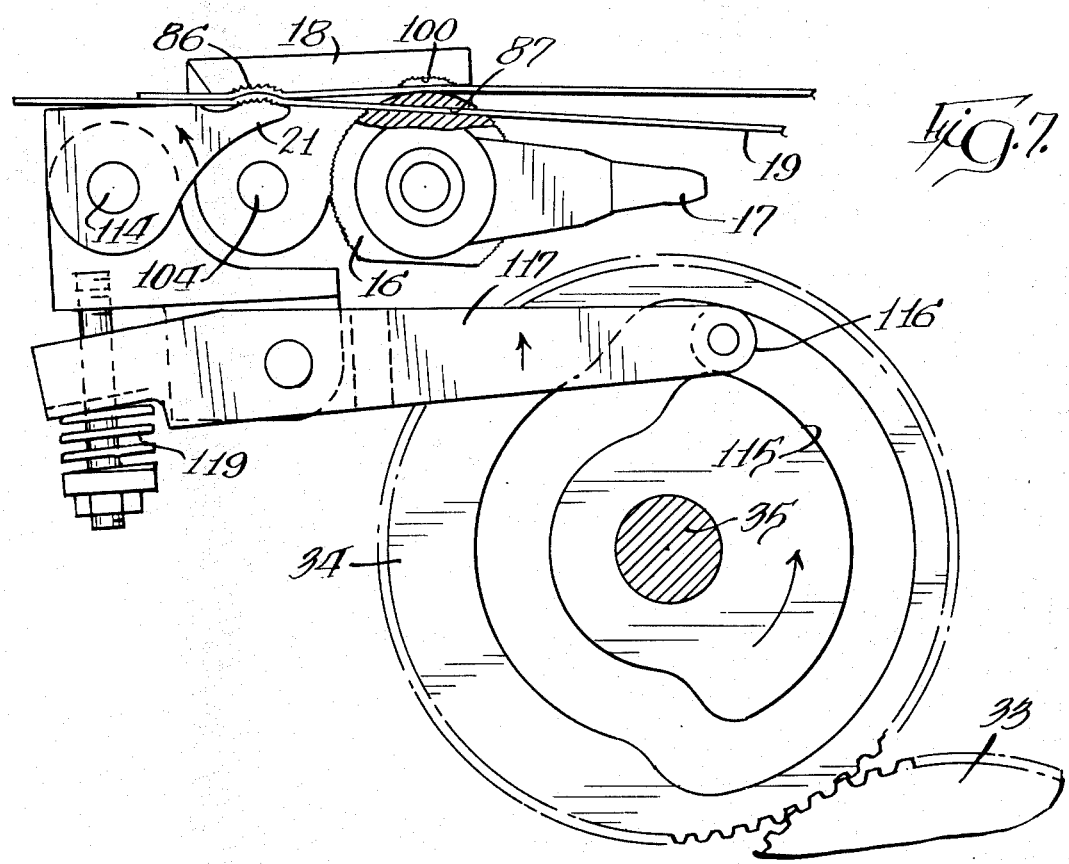
FIG. 7 is an enlarged fragmentary front elevational view showing the strap gripper position after the strap loop has been tensioned about the package.

When the excess strap has been taken up by the highspeed reverse rotation of feeder wheel 14, winder drum 11 is rotated in a clockwise direction so as to tension the formed strap loop about the package by winding strap 19 around outer peripheral surface 85 of winder drum 11. If desired, at least a portion of surface 85 can be a friction surface, i.e., a surface which is knurled or otherwise treated to provide a coefficient of friction sufficiently high to prevent slippage of strap during tensioning. Once the predetermined degree of tension has been attained, detent roller 66 (FIG. 6) releases input planetary gear 32, thus permitting cam gear 34 to turn and to actuate tension-holding gripper jaw 21 so as to urge overlying strap portions into holding engagement with recess 86 in anvil 18 (FIG. 7). At this stage, the strap passes through channel 87 in hammer 16, and the strap loop around the package is fully tensioned and ready to be severed from the strap supply roll and subsequently sealed by fusing together superimposed portions of the strap, or in any other convenient manner, e.g., by crimping a sealing element thereabout.

To avoid shattering of the strap at the point of severance, tension must be released in the strap segment which is not part of the tensioned loop before the strap is cut. Thus, once holding gripper jaw 21 is in the position shown in FIG. 7 and cam lobe 62 has moved a sufficient distance to release camcontrolled reaction arm 59 (FIGS. 3 and 6) reverse rotation of winder drum 11 to the position shown in phantom takes place, thereby releasing tension in that portion of strap 19 which is outside of the tensioned loop. Transmission lock 40 simultaneously holds tension until the point in time when tension is released by means of reaction arm 59.

Convenient strap severing means can be provided by mounting cutter bar 88 adjacent to the strap entry end of channel 87 and tangential to hammer 16 (FIGS. 5, 6 and 9). If desired, cutter bar 88 can be biased against hammer 16 by means of a leaf spring or the like. The blade portion of cutter bar 88 is positioned slightly below the strap entrance opening of channel 87. In this manner, the tensioned loop portion of the strap can be readily severed by merely rotating hammer 16 in a clockwise direction so as to urge the entering strap portion against and past the blade of cutter bar 88 (FIG. 9). The very end of the strap forming the loop, i.e., the distal end of the exposed trailing strap end portion, is gripped by hammer 16 at about the same time for subsequent sealing. To effect the cutting operation, hammer 16 is rotated clockwise by means of sector gear 89 which engages sector pinion 90 fixedly carried by torsion bar 24. As sector gear 89 is rotated counterclockwise, sector pinion 90, torsion bar 24 and hammer 16 are rotated clockwise through a predetermined arc. After the tensioned loop has been severed from the supply roll, the loop is ready for sealing as will be discussed in detail hereinbelow.

Strap Sealing Mechanism

Figure 11:
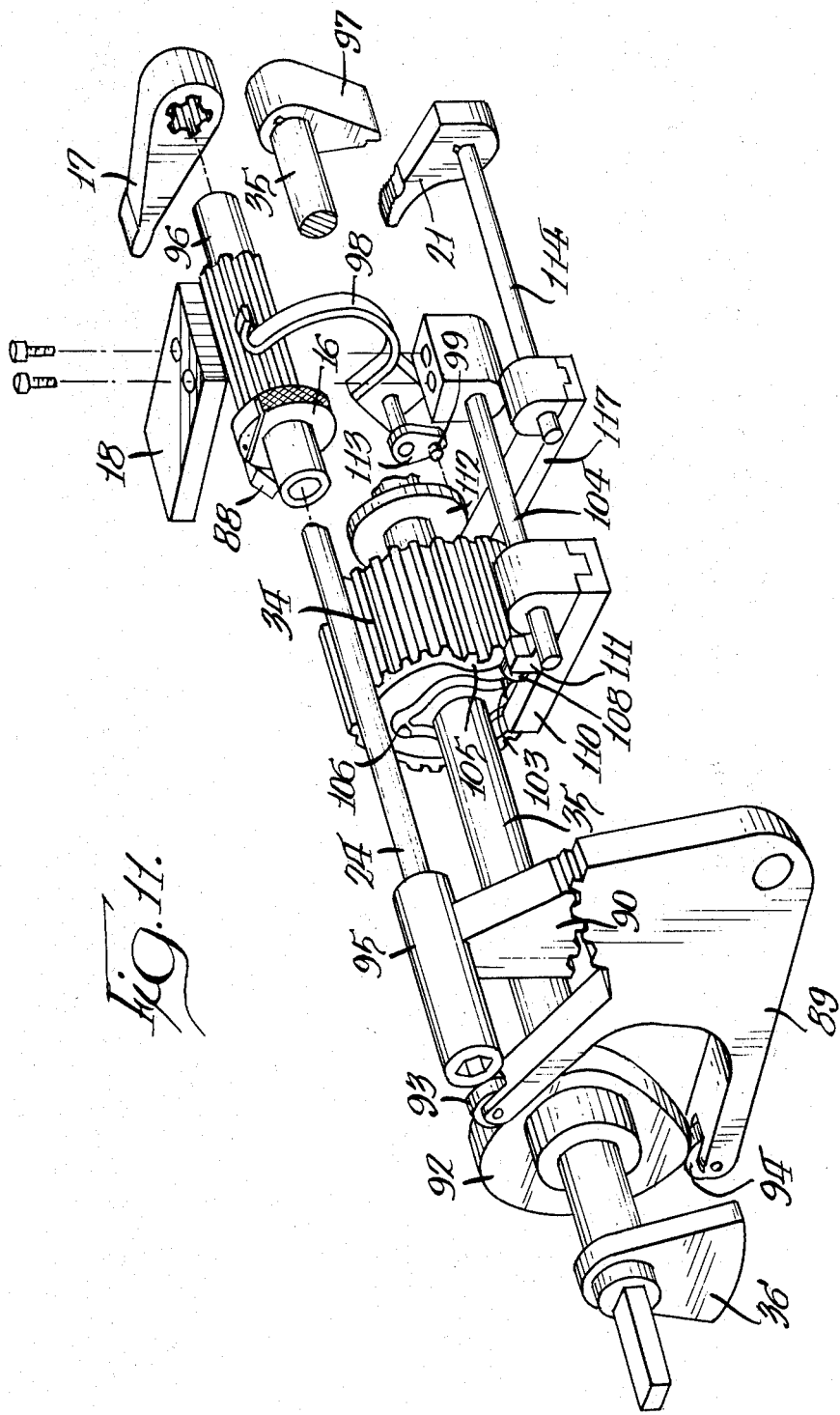
FIG. 11 is a fragmentary perspective view, partially broken away, taken from the rear of the apparatus shown in FIG. 1 and showing the strap sealing mechanism.

The sealing mechanism is illustrated in FIG. 11. Cam gear 34 is keyed to shaft 35 and is driven by cam drive gear 33 which is integral with input planetary ring gear 32 (FIG. 3). One end of cam shaft 35 carries limit switch cam lobe or trip cam 36 for switch 124. Sector cam 92 is fixedly mounted on shaft 35 adjacent one end thereof for rotation together with shaft 35. Cam followers 93 and 94 (FIG. 9), associated with pivotally-mounted sector gear 89 and maintained in a fixed position relative to one another, engage the camming surfaces of sector cam 92 (FIG. 9). The contour of camming surface of sector cam 92 and the positioning of cam followers 93 and 94 are such that during a part of the revolution of sector cam 92 cam followers 93 and 94 both engage the camming surface substantially simultaneously and lock sector gear 89 and sector pinion 90 against rotation. Pivotable sector pinion 90 meshes with sector gear 89 and is provided with axial sleeve 95. Torsion bar 24 extends substantially parallel to cam shaft 35 and one end of torsion bar 24, the anchoring end, is received within and keyed to axial sleeve 95, associated with sector pinion 90, which provides a pivotable support means therefor, thus torsion bar 24 can rotate together with sector pinion 90 but is locked against rotation when sector pinion 90 is locked.

As can be seen from FIG. 11, the distal end of torsion bar 24 is keyed to hammer shaft 96 which carries fixedly mounted thereon hammer 16 having an arcuate outer surface and trigger 17 fixedly connected to hammer 16 by means of hammer shaft 96. Trigger cocking cam 97 is keyed to shaft 35 at the end thereof opposite from the end carrying cam gear 34. Pivotally-mounted ejector arm 98 is cam-actuated and is operably associated with cam gear 34 so that ejector cam follower 99 engages a camming surface on ejector cam 112. In a similar manner, holding gripper jaw 21 mounted on shaft 114 and anvil 18 mounted on shaft 104 both are adapted for actuation by respective camming surfaces integral with cam gear 34.

Figure 8:
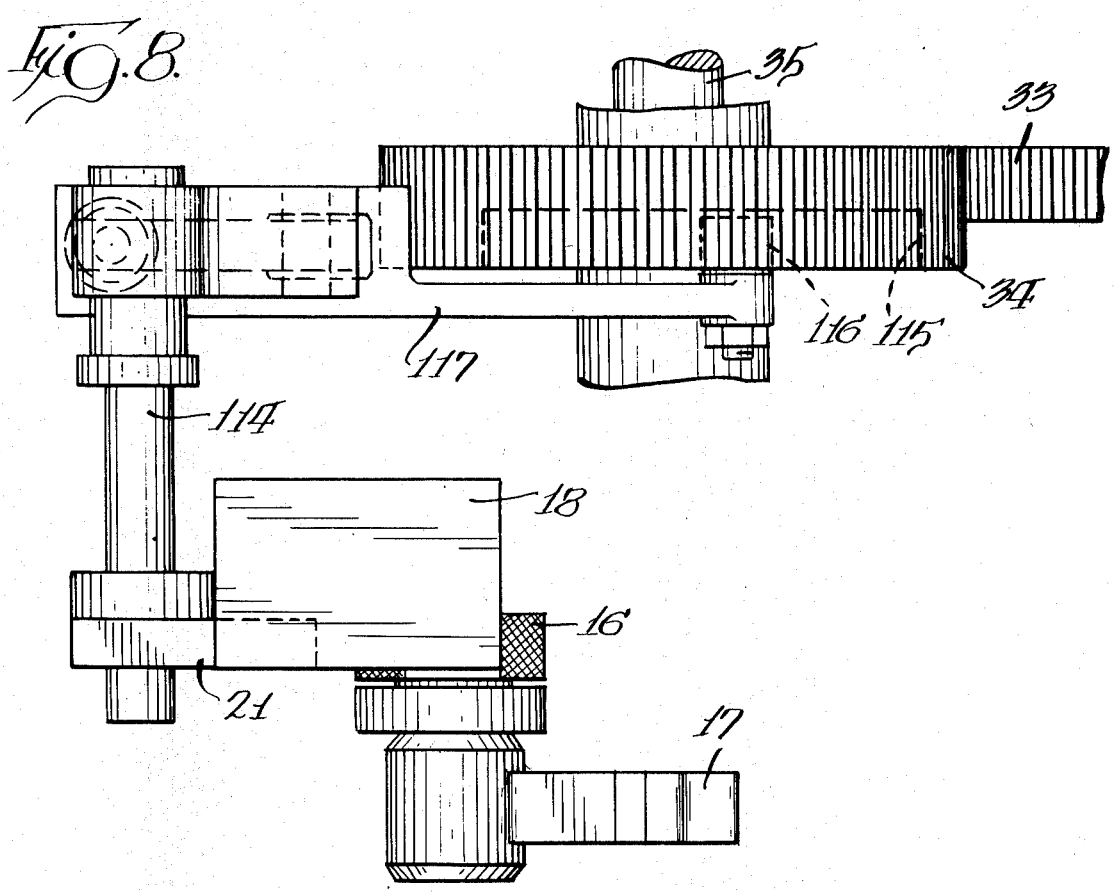
FIG. 8 is a plan view of the strap gripper position shown in FIG. 7.

For gripper jaw 21, cam follower 116 carried by arm 117 engages cam surface 115 in cam gear 34 (FIGS. 7 and 8). Arm 117 is operably connected to gripper jaw 21 so that jaw 21 will move in response to movement by carrier arm 117. Pressure spring 119 urges cam follower 116 in contact with cam surface 115. Similarly, for actuation of anvil 18, cam followers 103 and 108 (FIG. 15) engage camming surfaces provided on cam gear 34 so that anvil 18 can be pivoted and retracted as needed during the operating cycle.

Operation of Strap Sealing Mechanism

As mentioned hereinabove, sealing of the superimposed thermoplastic strap portions by fusion can be effected by longitudinally rubbing one overlying strap portion against the other at a rapid rate and under pressure so as to generate by friction sufficient heat to melt localized, substantially coextensive interface regions of the strap which are subsequently solidified. Such a friction-fusion operation is carried out by the strap sealing mechanism. For sealing, the anchoring end of torsion bar 24 is first immobilized, then cocked, and thereafter released.

Figure 12:
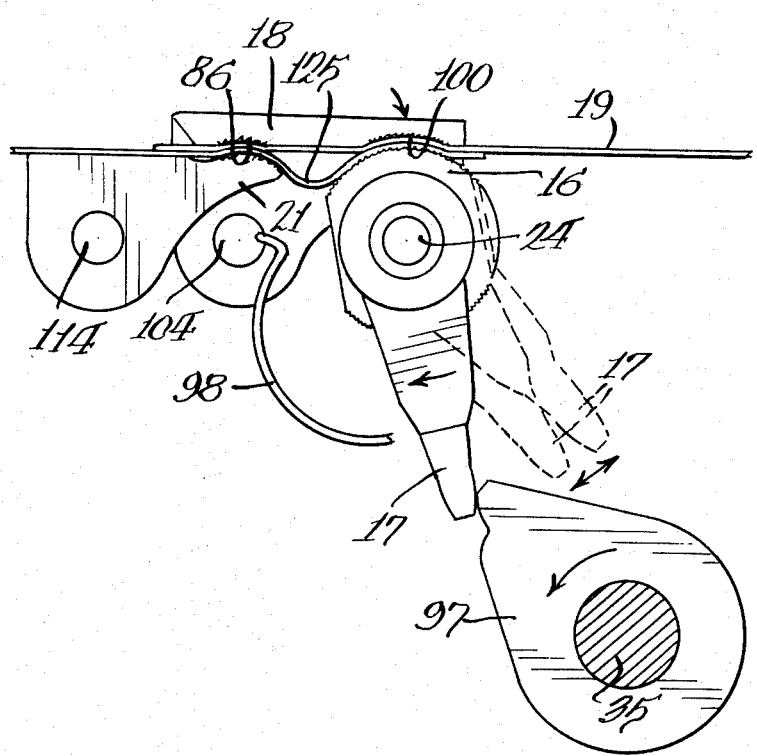
FIG. 12 is an enlarged fragmentary front elevational view showing hammer action during strap sealing operation.
Figure 13:
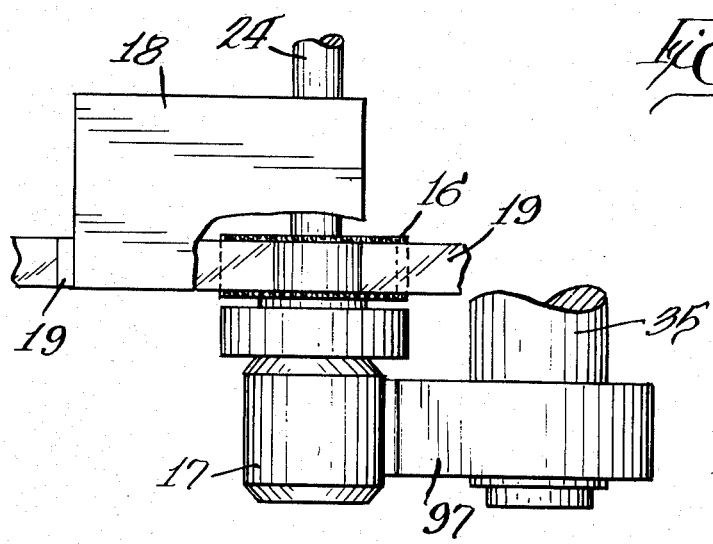
FIG. 13 is a plan view, partially broken away, of FIG. 11.

Torsion bar 24 serves as the oscillating motor means for hammer 16 and must be mounted for twisting in order to store energy therein sufficient to oscillate hammer 16 during the friction-fusion step. However, torsion bar 24 must also be rotatable in order to locate trigger 17 in an intercepting position vis-a-via cocking cam 97 and to sever a strap segment after a tensioned loop has been formed about a package. To this end sector gear 89 (FIGS. 9, 10 and 11) is equipped with cam followers 93 and 94 which ride on the surface of sector cam 92. At a predetermined time during the operating cycle cam followers 93 and 94 are held in a spatially-fixed position immobilizing sector gear 89 and sector pinion 90 which carries torsion bar 24. At about the same time, and before trigger 17 is cocked, ejector arm 98 is retracted (FIG. 12) so as to provide room for accommodation of strap loop or bight 125 which is formed during the oscillation of trigger 17. During the time period while sector gear 89, and thus torsion bar 24, is immobilized, trigger 17 is first cocked by the action of cocking cam 97, thereby twisting torsion bar 24 and storing energy therein. Further rotational motion of cocking cam 97 releases trigger 17 and releases the energy stored in torsion bar 24 by oscillating hammer 16 and rubbing a free distal end portion of strap against a juxtaposed strap region which is under tension. Trigger 17 is released at its maximum displacement position. In this manner the strap is not unduly stressed during the friction-fusion step and rupture of the strap is avoided. The relative positions of trigger 17 and cocking cam 97 are shown in FIGS. 12 and 13 with the sealing oscillations of hammer 16 and trigger 17 depicted in phantom. It is also to be noted that during the friction-fusion step the tensioned strap loop is held by the action of gripper jaw 21 which urges both overlapping strap portions into holding recess 86 which anvil 18 is pivoted downwardly and serves as a force-generating means which bears against the overlapping strap portions urged into sealing recess 100 by the arcuate outer surface of hammer 16.

As the energy previously stored in torsion bar 24 by cocking cam 97 is dissipated by oscillating hammer 16, both strap portions continue to be pinched between anvil 18 and hammer 16 while the molten strap interface produced at the very end of the exposed, untensioned strap end portion solidifies, thereby welding the tensioned loop and forming a seal without a loose corner or end that could snag. After the formed weld has cooled sufficiently to withstand the tension within the loop, tension-holding gripper jaw 21 is released and anvil 18 is pivoted away from hammer 16 and retracted so as to permit the sealed strap loop to snap against the package (FIGS. 14 and 15). At the same time, ejector arm 98 is moved upwardly by means of ejector arm cam follower 99 which is carried by pivotally mounted arm 113 and guided by ejector camming surface 101 in cam disc 112 to assure that the sealed strap clears anvil 18 and hammer 16 returns to normal rest position. Cam disc 112 is carried on the same shaft as cam gear 34.

As best seen in FIG. 15, actuation of anvil 18 is accomplished by cam followers 103 and 108. Anvil 18 is carried on shaft 104 which is slidably and rotatably journaled in boss 109. Cam follower 103 is carried on carrier arm 110, which, in turn, is affixed to shaft 104 so that anvil 18 can be pivoted when arm 110 pivots. Cam follower 103 engages cam groove or surface 106 in cam gear 34 which surface controls the pivoting action of anvil 18. Pressure spring 118 (FIG. 6) urges cam follower 103 in contact with cam surface 106. Cam gear 34 is also provided with cam lobe 105 which serves to retract anvil 18. To this end, anvil-retracting arm 111 is journaled on shaft 104 and carries cam follower 108 which is adapted to engage lobe 105 at a predetermined point in time after the sealing cycle so as to permit the expulsion of the sealed and tensioned loop out of the sealing mechanism. Spring 107 around shaft 104 biases anvil 18 in the forward position.

Strapping and Sealing Cycle

To strap and subsequently seal a package with thermoplastic strap, electric motor 25 is energized by closing an appropriate start switch (not shown). Power input to shaft 22 (FIG. 4) is transmitted through the three input planetary gears such as planet gears 29 and 30 and through input carrier gear 28 to winder input gear 37. Input planetary ring gear 32 is stationary at this time because of the action of detent roller 66, and transmission lock arm 48 holds down tang 44 permitting only clockwise rotation of lock shaft gear 47. Tension control spring 65 urges detent roller 66 into the detent groove of detent cam 67, thereby preventing movement of input planetary ring gear 32.

The resultant counterclockwise rotation of winder input gear 37 drives feed wheel 14 in a clockwise direction through the winder planet gears such as planetary gears 52 and 53, and through the strap feeder planetary gears 56 and 57. Feed wheel input sun gear 69 is, in turn, driven by the strap feeder planetary gears and thus drives input shaft 39 which, in turn, drives feed wheel 14 through drive gear 70 and pinion 71. Winder planetary ring gear 73 tends to move in a counterclockwise direction as a result, but is held in place by pin 75 which is abutting stop 76. Likewise, the tendency of tension release ring gear 58 is to rotate in a clockwise direction; however, reaction arm 59 abuts stop bar 61 and prevents rotation.

Strap 19, fed into first arcuate guideway 12 of winder drum 11 via strap inlet guideway 121, contacts rotating feed wheel 14 and is transported through drum 11 via arcuate guideways 12 and 13 (FIG. 1). Bias or pinch roller 91 assures good contact between strap 19 and feed wheel 14. Thereafter strap 19 enters strap guideway 15 via strap exit guideway 122 which directs the strap through the strap sealing mechanism by first threading strap 19 through channel 87 in hammer 16 and then into a peripheral strap guideway which directs the strap about a package to be strapped so as to form a loop. The leading end of strap 19 is returned to the sealing mechanism via substantially horizontal peripheral strap guideway portion 20. The passing of leading strap end is detected by limit switch 23 whereupon switch 23 causes reversal of electric motor 25 by the time the leading strap end arrives adjacent to gripper jaw 21.

Upon reversal of motor 25, cam drive gear 33 and cam gear 34 begin to turn as explained before, anvil 18 pivots down against hammer 16 to grip the leading strap end therebetween, transmission lock arm 48 shifts to release tang 44 and pushes against tang 46, and feed wheel 14 rapidly removes excess strap from the peripheral strap guideway while transmission lock means 40 only permits counterclockwise rotation of feed wheel 14. The tencency of winder drum 11 at this time is to move away from stop 76; however, the action of drag brake 77 against the outer surface of winder planetary ring gear 73 prevents such movement. When the strap being taken up becomes taut and is drawn to a predetermined tension, drag brake 77 begins to slip and feed wheel 14 stops. The tension in a given instance depends on the brake setting for the particular strap that is being used. At the same time, winder drum 11 begins to rotate slowly in a clockwise direction pulling strap against and in frictional engagement with the convex surface of second arcuate strap guideway 13 and winding strap around the outer peripheral surface of drum 11. The relatively large gear reduction to winder drum 11 provides considerable torque for tensioning the strap, and the relatively large diameter of winder drum 11 provides substantially straight line pull on the strap during tensioning, thereby minimizing the tendency of plastic strap to scuff or delaminate. As tension builds up into the strap, frictional drag of the strap against arcuate guideway 13 increases, thereby preventing the strap from slipping back as drum 11 continues to turn. This function can be enhanced by the provision of the optional feed wheel lock pawl 79 discussed hereinabove. If desired, the convex surface of guideway 13 can be made so as to have a relatively high coefficient of friction to assist in the strap tensioning. Such a high frictional drag surface will not interfere with the strap feeding operation because at that time the strap passing through winder drum 11 hugs the opposite, concave surface of guideway 13.

Further increase in strap tension as drum 11 rotates pulls reaction arm 59 downwardly; however, inasmuch as cam lobe 62 (FIG. 3) at this point in time is positioned immediately below cam follower 60 carried by arm 59, the downward movement of arm 59 is limited. When a predetermined maximum tension is achieved, as determined by the setting of tension adjustment knob 68, detent roller 66 is cammed out, input planetary ring gear 32 and thus cam drive gear 33 begin to turn actuating cam gear 34. Cam surface 115 on cam gear 34 (FIG. 7) causes holding gripper jaw 21 to be pivoted against anvil 18, thereby urging both overlapped strap portions into recess 86 so as to hold tension in the formed strap loop. Shortly thereafter anvil 18 is pivoted in a counterclockwise direction releasing the upper strap from sealing recess 100.

As cam lobe 62 continues to rotate in a clockwise direction, reaction arm 59 moves downwardly and winder drum 11 begins to rotate in a counterclockwise direction because of the tension in the strap, thus releasing tension on that portion of the strap which is not part of the tensioned loop. At this time, both tangs 44 and 46 of transmission lock means 40 are released, thereby locking winder input gear 37 in both directions. Of course, inasmuch as winder input gear 37 is locked, input carrier gear 28 meshing with input gear 37 is also locked and the power flow from input shaft 22 is through input sun gear 31, the three input planet gears such as gears 29 and 30 (FIG. 3), and through input planetary ring gear 32 which drives cam shaft 35 through cam drive gear 33 and cam gear 34.

Continued rotation of cam shaft 35 positions sector cam 92 (FIGS. 9, 10 and 11) so that sector gear 89 is pivoted in a counterclockwise direction driving sector pinion 90 and thus hammer 16 in a clockwise direction. Inasmuch as the trailing end of the strap loop is still positioned within channel 87 of hammer 16, the clockwise rotation of hammer 16 urges the trailing end against cutter blade 88 and severs the trailing end from the strap supply roll. Continued clockwise rotation of hammer 16 by sector pinion 90 withdraws the trailing strap end from channel 87 and positions it against a tensioned strap portion of the loop which extends over sealing recess 100.

At about the same time sector cam 92 is in contact with both cam follower 93 and cam follower 94 and sector gear 89 is locked in a spatially-fixed position for a predetermined time period while sector cam 92 continues to rotate. The locking of sector gear 89 also locks one end of torsion bar 24.

The aforedescribed clockwise rotation of hammer 16 has placed trigger 17 in an intercept position vis-a-vis trigger cocking cam 97. As trigger 17 is approached and ultimately engaged by cocking cam 97, ejector 98 begins to retract while torsion bar 24 is twisted by the action of cam 97 on trigger 17. After trigger 17 is fully cocked, there is a slight dwell period during which anvil 18 is pivoted downwardly against hammer 16 so that both overlying strap portions are urged into sealing recess 100.

Continued clockwise rotation of cocking cam 97 releases trigger 17, and hammer 16 begins to oscillate as shown in phantom in FIG. 12. Inasmuch as the knurled or serrated arcuate outer surface of hammer 16 grips the lowermost, untensioned trailing strap end portion, the net result of the hammer oscillation is to rub one strap section against another, thereby melting an interface region therebetween. However, the hammer oscillations are not dampened by tension drawn in the loop as in previous machines nor due to a need to move a relatively large mass of strap. After the oscillations cease, the molten interface region solidifies substantially instantaneously, forming a friction-fused joint. As trigger 17 assumes its rest position at the end of the oscillating period, hammer 16 draws the strap tail into recess 100, thereby fusing the tail to the underlying strap portion and providing a tailless seal.

As the formed joint cools, the overlapping strap portions continue to be pinched between anvil 18 and hammer 16; however, holding gripper jaw 21 is released from pinching both strap portions at holding recess 86 by pivoting downwardly in a clockwise direction. By this time the friction-fused joint is fully formed and anvil pressure is removed from the joint by pivoting anvil 18 in a counterclockwise direction and then retracting. As soon as anvil 18 has retracted, ejector arm 98 moves upwardly, expelling the formed joint from the sealing mechanism, and hammer 16 is pivoted counterclockwise toward its normal starting position. Thereafter ejector arm 98 is moved down and anvil 18 returns to its forwardmost position over hammer 16. At the end of the operating cycle, detent roller 66 again engages input planetary ring gear 32 and limit switch cam lobe 36 (FIGS. 3 and 11) actuates limit switch 124 to place motor 25 in the forward opertional mode for the next strapping and sealing cycle at which time winder drum 11 is returned to its home position so that pin 75 abuts stop 76. During the counterclockwise return rotation of winder drum 11, any strap on the outer surface of drum 11 is pushed against outer guide 120 and back toward strap guide 15. Until drum 11 returns to its home position, feed wheel 14 is locked, so that the return of drum 11 must be completed first before feed wheel 14 can be actuated for the next strap feeding cycle.

The duration of the combined sealing and strapping cycle can vary, dependent on the speed at which the apparatus of this invention is driven. Howevr, strapping and sealing cycles having a duration of the order of about two seconds are readily obtainable.

The foregoing specification and the drawings are intended as illustrative of this invention and are not to be taken as limiting. Still other variations and rearrangements of parts are possible without departing from the spirit and scope of the present invention.

I claim:

1. A strapping apparatus for providing a tensioned loop of thermoplastic strap about a package which comprises means for automatically feeding and tensioning a thermoplastic strap segment in a loop about the package;
   positioning means for locating leading and trailing portions of the looped strap segment in an overlapping relationship relative to one another;
   grip means holding the overlapped portions in said positioning means so as to expose an untensioned trailing strap end portion;
   force-generating means for frictionally engaging distal end of the exposed trailing strap end portion and urging an inner face region of said exposed trailing strap end portion against an inner face region of a loop strap section in tension, said force-generating means including a pivotable hammer having a strap engaging surface and a channel defining a gate through which strap forming said loop passes;
   a cutter means positioned adjacent to said gate and coacting with said gate to sever the strap when said hammer is pivoted after said loop is formed but before the exposed end portion is oscillated; and
   energizing means associated with the force-generating means for longitudinally oscillating said distal end of the exposed end portion relative to said loop strap section to fuse said distal end of the exposed end portion with said strap section at an interface region thereof and to securely weld the exposed end portion to the strap section at said interface region.

2. The apparatus in accordance with claim 1 wherein said force-generating means further includes a pivotable anvil having a recess, wherein said pivotable hammer is provided with an arcuate strap-engaging surface receivable within said recess, and wherein the energizing means comprises a rotatable torsion bar having one end portion mounted in a pivotable support means at the rotational axis of said support means and a free end keyed to said hammer at the rotational axis of said hammer, means locking the mounted portion of the torsion bar against rotation, and means for twisting the torsion bar a predetermined amount and subsequently releasing the torsion bar while said mounted end portion is locked.

3. The appartus in accordance with claim 1 wherein said force-generating means further includes a pivotable and retractable anvil associated with said pivotable hammer; wherein said energizing means comprises a torsion bar having one end mounted in a pivotable support means and a free end keyed to said hammer at the rotational axis of said hammer, means for locking the mounted end portion of said torsion bar against rotation, and means for twisting the torsion bar a predetermined amount and subsequently releasing the twisted torsion bar when said mounted end portion is locked; said hammer being provided with a convex strap-engaging surface and said anvil being provided with a recess having a complementary concave strap engaging surface.

4. The apparatus in accordance with the claim 3 wherein said means for locking the mounted end portion of said torsion bar comprises a pivotable sector pinion provided with an axial sleeve fixedly receiving therein said mounted torsion bar end portion, a pivotally mounted sector gear meshing with said sector pinion and provided with a pair of peripherally spaced cam follower means, and a rotatable sector cam means adapted to engage both of said cam follower means substantially simultaneously.

5. Apparatus for sealing a loop formed of a tensioned thermoplastic strap segment about an article which comprises positioning means for locating portions of said strap segment in an overlapping relationship relative to each other;
   grip means associated with said positioning means for engaging and holding the overlapped portions in said positioning means so as to expose a free end portion;
   force-generating means for frictionally engaging the free exposed end portion and urging the free exposed end portion against an overlying loop strap section in tension; and
   energy-storing, oscillating motor means associated with the force-generating means for longitudinally oscillating the free exposed end portion relative to said overlying loop strap section to fuse the free exposed end portion to the strap section at the interface region thereof.

6. The apparatus in accordance with claim 5 wherein said force-generating means comprises a pivotable anvil and a complementary rotatable hammer having an arcuate strap-engaging surface, and wherein the motor means comprises a torsion bar having one end portion rotatably mounted and a free end keyed to said hammer at the axis of rotation thereof, means for locking the rotatably-mounted end portion of said torsion bar against rotation, and means for twisting the torsion bar a predetermined amount and subsequently releasing the torsion bar while the rotatably-mounted end portion of said torsion bar is locked.

7. The apparatus in accordance with claim 5 wherein the said force-generating means comprises a rotatable hammer having a channel defining a gate through which strap forming said loop passes and wherein a cutter means is positioned adjacent to said gate and coacts with said gate to sever the strap after said loop is formed.

8. Apparatus for sealing a loop formed of a tensioned thermoplastic strap segment about an article which comprises positioning means for locating portions of said strap segment in an overlapping relationship relative to each other;
   grip means associated with said positioning means for engaging and holding the overlapped portions in said positioning means so as to expose a free end portion;
   force-generating means for frictionally engaging the free exposed end portion and urging the free exposed end portion against an overlying loop strap section in tension and comprising a pivotable and retractable anvil associated with a rotatable hammer, said hammer being provided with a convex strap-engaging surface and said anvil being provided with a complementary concave strap engaging surface; and
   energy-storing, oscillating motor means associated with the force-generating means for longitudinally oscillating the free exposed end portion relative to said overlying loop strap section to fuse the free exposed end portion to the strap section at the interface region thereof comprising a torsion bar having one end mounted in a pivotable support means and a free end keyed to said hammer at the axis of rotation of said hammer, means for locking the mounted end portion of said torsion bar against rotation, and means for twisting the torsion bar a predetermined amount and subsequently releasing the twisted torsion bar while the mounted end portion thereof is locked against rotation.

9. The apparatus in accordance with claim 8 wherein said means for locking the mounted end portion of said torsion bar against rotation comprises a rotatably mounted sector cam means, a pivotally-mounted sector gear means carrying a pair of substantially coplanar spaced cam follower means adapted to engage substantially simultaneously said sector cam means, and a pivotable sector pinion means meshing with said sector gear means and provided with an axially-disposed sleeve means which fixedly receives therein said mounted torsion bar end portion.

10. A method for securing a thermoplastic strap around a package comprising the steps of forming a length of strap roll into a loop around the package to provide overlapping strap portions;

gripping the leading strap end of said length of strap;

tensioning the loop around the package by pulling on said strap in a direction opposite from the strap feed direction;

gripping the overlapping strap portions so as to maintain tension in the loop and to provide an untensioned, underlying, exposed trailing strap end portion;

severing the forming loop from the strap roll; thereafter pressing an inner face region of the extreme end of the untensioned, exposed trailing strap end portion against an inner face of an overlying loop strap in tension; and causing relative longitudinal oscillatory motion between the extreme end of the untensioned, exposed trailing strap end portion and the overlying loop strap section in tension to generate heat and to fuse the trailing strap end portion with the overlying loop strap section.

11. The method in accordance with claim 10 wherein the relative motion is caused by oscillating the extreme end of the exposed trailing end portion against the overlying loop strap section.

12. The method in accordance with claim 11 wherein the extreme end of the exposed trailing end portion is oscillated in a longitudinal direction of the strap and against the overlying loop strap section.

* * * * *